L. BLESSING.
SPRING WHEEL.
APPLICATION FILED JUNE 11, 1909.

974,347.

Patented Nov. 1, 1910.

Witnesses
A. M. Shannon.
A. M. Dorr.

Inventor
Louis Blessing.

By
Attorneys

UNITED STATES PATENT OFFICE.

LOUIS BLESSING, OF JACKSON, MICHIGAN.

SPRING-WHEEL.

974,347. Specification of Letters Patent. Patented Nov. 1, 1910.

Application filed June 11, 1909. Serial No. 501,480.

*To all whom it may concern:*

Be it known that I, LOUIS BLESSING, a citizen of the United States of America, residing at Jackson, in the county of Jackson and State of Michigan, have invented certain new and useful Improvements in Spring-Wheels, of which the following is a specification, reference being had therein to the accompanying drawings.

This invention relates to spring wheels and to certain features of construction whereby a large number of spring members are assembled in compact form that reduces the bulk of the wheel, but does not affect the resiliency thereof.

The invention consists in the matters hereinafter set forth and more particularly pointed out in the appended claims.

Figure 1:
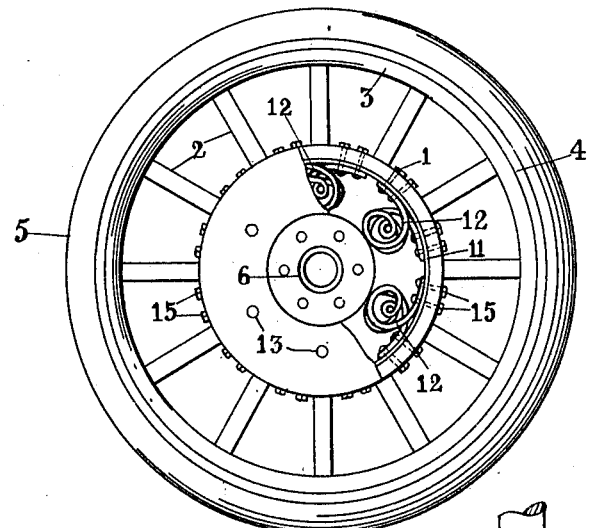
Figure 3:
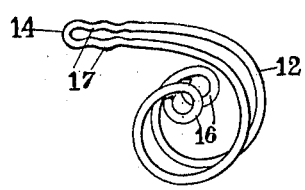
Figure 2:
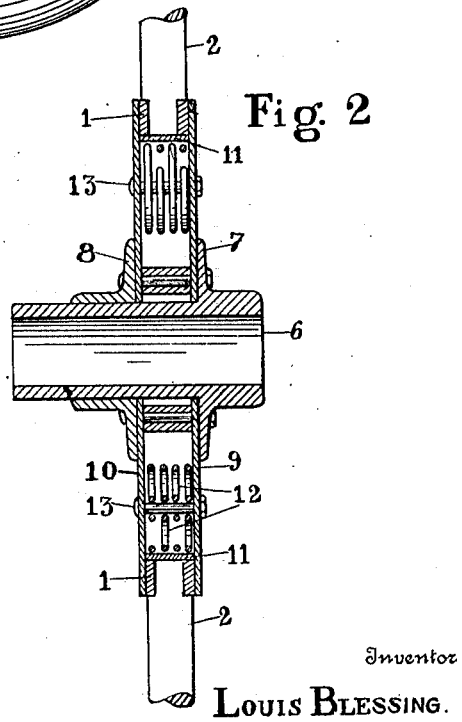

In the drawings, Figure 1 is a view in side elevation, with parts broken away, of a wheel embodying features of the invention. Fig. 2 is a view in section of the wheel. Fig. 3 is a view in detail of one of the spring members.

Referring to the drawings, an inner felly 1 or ring is concentrically secured by spokes 2 within a felly 3, the latter being provided with a rim 4, and also cushion tire 5, if desired.

A hub 6 has a fixed flange 7 and removable flange 8 on which circular guide plates 9 and 10 are secured, the latter having sliding contact with the ring 1 which is oscillatory on the hub between them.

The ring 1 which is preferably built up of wood, reinforced with an inner ferrule 11 of metal, is yieldingly centered on the hub, when not under load, by pairs of oppositely disposed spiral springs 12 whose inner ends engage bolts 13 spanning the interval between the plates 9 and 10 within the ring and whose outer ends are secured against the inner face of the ring or ferrule by bolts 15 or other suitable means.

In the preferred form, each spiral consists of a bar of spring material bent on itself to form two parallel arms, in spaced relation, the inner ends 16 being turned into closed loops or eyelets adapted to encircle the bolts 13, and the outer end 14 of the spiral, which is the folded or return bend of the bar, have transverse crimps 17, whereby the spring does not tend to slip on a screw or bolt passed between the spring arms at this point.

The spring bars are preferably cylindrical in cross-section, and in assembling the pairs on the bolts in the wheel, the arms of the springs are passed between each other, thus reducing the space which would be ordinarily occupied by the spirals placed side by side.

The use of the round bar gives great strength to the spring and great resiliency, while the wheel body is compact and attractive in appearance.

Obviously, changes in the details of construction may be made without departing from the spirit of the invention, and I do not care to limit myself to any particular form or arrangement of parts.

What I claim as my invention is:—

1. A spring wheel comprising a hub provided with a pair of parallel, spaced flanges, a ring loosely encircling the hub between the flanges and carrying conventionally disposed spokes, felly and rim, cross-members connecting the flanges within the ring, and pairs of oppositely disposed spiral springs on each cross member whose inner ends are secured thereto and whose outer ends are each secured to the ring, each spring consisting of a bar bent between its ends into spaced, parallel arms which are inturned in corresponding spirals, the inner ends being formed into eyelets encircling the cross-members, and the outer portions of each bar at the return bend being transversely crimped.

2. A spring wheel comprising a hub provided with a pair of parallel, spaced flanges, a ring loosely encircling the hub between the flanges and carrying conventionally disposed spokes, felly and rim, cross-bolts connecting the flanges within the ring, and pairs of oppositely disposed spiral springs on each bolt whose outer ends are oppositely directed, each spring comprising a bar bent on itself between its ends into parallel spaced arms whose inner ends form closed eyelets adapted to engage a cross-bolt and means securing the outer portion to the ring.

3. A spring wheel comprising a hub provided with a pair of parallel, spaced flanges, a ring loosely encircling the hub between the flanges and carrying conventionally disposed spokes, felly and rim, cross-bolts connecting the flanges within the ring, and pairs of oppositely disposed spiral springs on each bolt whose outer ends are oppositely directed, each spring comprising a bar bent on itself between its ends into parallel spaced arms whose inner ends form closed eyelets adapted to engage a cross-bolt, and means securing the outer portion to the ring, and the ends of the springs of each pair being alternately arranged on the bolt.

In testimony whereof I affix my signature in presence of two witnesses.

LOUIS BLESSING.

Witnesses:
 F. H. NEWKIRK,
 H. W. BUCKNELL.